United States Patent [19]

Thyzel et al.

[11] Patent Number: 4,733,400
[45] Date of Patent: Mar. 22, 1988

[54] SAFETY SHUTDOWN SYSTEM FOR A DYE LASER

[75] Inventors: Reinhardt Thyzel, Obere Bergstr. 3, 8501 Heroldsberg; Eckhard Schröder, Eckental, both of Fed. Rep. of Germany

[73] Assignee: Reinhardt Thyzel, Heroldsberg, Fed. Rep. of Germany

[21] Appl. No.: 827,933

[22] PCT Filed: Apr. 26, 1985

[86] PCT No.: PCT/DE85/00135
§ 371 Date: Feb. 24, 1986
§ 102(e) Date: Feb. 24, 1986

[87] PCT Pub. No.: WO85/04990
PCT Pub. Date: Nov. 7, 1985

[30] Foreign Application Priority Data

Apr. 26, 1984 [DE] Fed. Rep. of Germany ....... 3415574

[51] Int. Cl.[4] ................................................ H01S 3/20
[52] U.S. Cl. ......................................... 372/51; 372/33; 372/38; 372/54

[58] Field of Search ...................... 372/33, 38, 51, 53, 372/54, 58, 59, 109; 219/121 LB, 121 FS; 250/577; 73/293; 340/618–619; 210/86, 97; 307/445

[56] References Cited

U.S. PATENT DOCUMENTS 4,364,015 12/1982 Drake et al. .................... 372/53

Primary Examiner—James W. Davie
Assistant Examiner—B. Randolph
Attorney, Agent, or Firm—Thomas Schneck

[57] ABSTRACT

A control system for a dye laser is described, in which a pump pumps the dye from a supply vessel into a pressure vessel, in which there is an air pocket for damping vibrations, fluctuations in the pump delivery, etc. The dye passes out of the supply vessel as a jet via a nozzle. At least one sensor measures the dye filling level in the supply vessel and a control switches off the dye laser when the level in the supply vessel does not drop to the correct value after switching on the laser. The control system of the invention prevents the switching on of the laser if the level is too high or low before putting the laser into operation.

5 Claims, 2 Drawing Figures

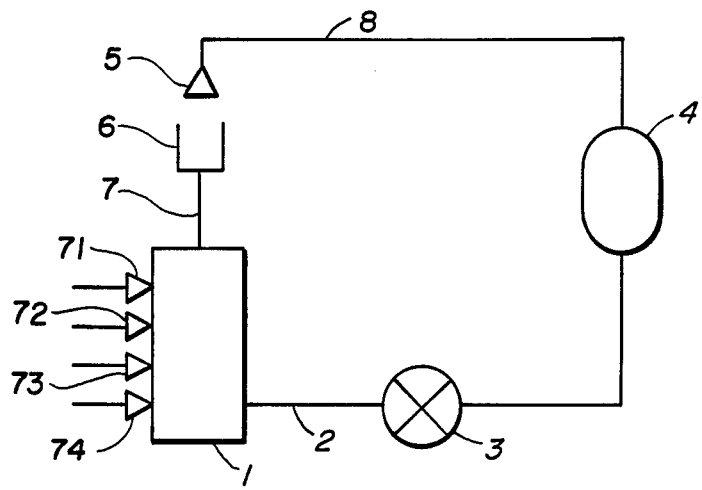
FIG._1.
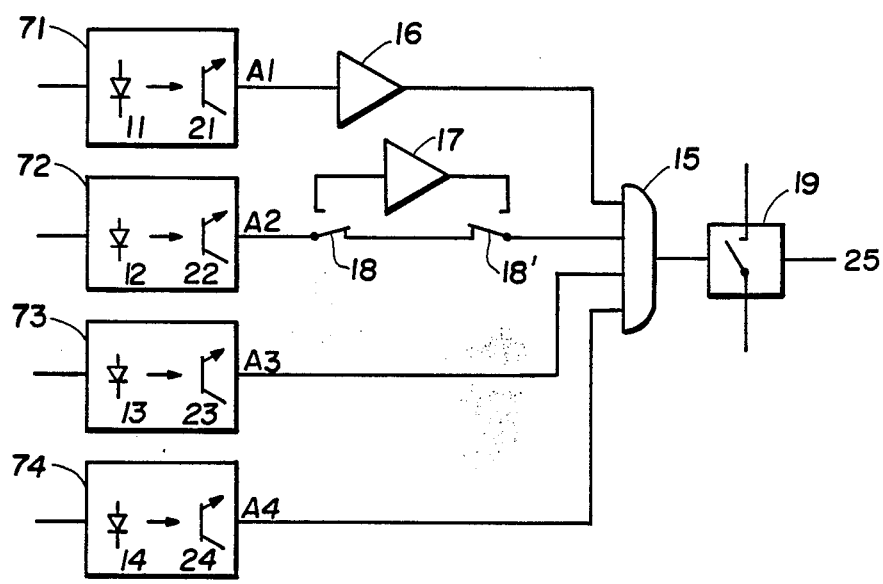
FIG._2.

SAFETY SHUTDOWN SYSTEM FOR A DYE LASER

DESCRIPTION

1. Technical Field

The invention relates to a dye laser and in particular to a safety shutdown system for a dye laser.

2. Background Art

It is of interest to use dye lasers in many fields of technology and medicine. The type of dye laser on which the invention is based has the advantage that there is a comparatively large dye reservoir, so that the dye supply is not used up too quickly. In the case of such dye lasers, the dye is pumped from a supply vessel into a pressure vessel, in which there is an air pocket, which damps the vibrations, power fluctuations of the feed pump, etc. From this pressure vessel, the dye passes out as a so-called jet into the area where the actual laser process takes place. When the dye has left this area, it flows back into the supply vessel.

In spite of this, the presently available dye lasers require continuous service to ensure that they are always operational.

In particular, their operating characteristics can vary after only a short time. As a result they are unsuitable for routine use in medical technology and particularly in examining and/or performing surgery on the eyes.

An object of the invention is to provide a dye laser, which can be operated with constant operating characteristics even in the case of long service intervals.

DISCLOSURE OF INVENTION

The invention has recognized that a solution of the problem is possible if use is made of a dye laser, in which a pump pumps dye from a supply vessel into a pressure vessel, in which there is an air pocket for damping vibrations and fluctuations in the delivery of the pump and from which the dye is discharged as a jet via a nozzle into an active laser region and subsequently flows back into the supply vessel by means of a line. The inventors have recognized that the fluctuations in the operating data occurring with known dye lasers of this type are often caused by faults or disturbances in the dye circuit. The reason for these faults can, e.g., be blocking of lines, the nozzle through which the dye is discharged as a jet, an incorrect opening of a solenoid valve between the pressure vessel and the nozzle, leaks in the dye circuit or a too low filling level in the dye supply vessel.

According to the invention these different causes for fluctuations in the laser operating characteristics can be detected by monitoring the filling level in the supply vessel. Thus, the invention provides a control, to which is applied the output signal of at least one level sensor and which detects from the drop in the filling level after switching on the dye laser whether there is an operating fault or the laser is operating correctly.

As pressure builds up after switching on the feed pump, the air pocket in the pressure vessel is compressed. Thus, the level in the supply vessel must drop by a certain amount after switching on and said amount is dependent on the geometry data of the dye circuit and the pressure built up by the pump.

If the level does not drop by this amount, it means that, e.g., a line is blocked, the pump delivery is too low or the solenoid valve which permits the dye discharge is or is not adequately opened. However, if the level drops too sharply, this can indicate a leak in the dye circuit or the like.

Thus, the dye laser is always switched off if the level does not drop by a predetermined amount, because then there must be faults in the dye circuit, which very probably influenced the operating characteristics of the dye laser.

The control provided according to the invention can be constructed in a known manner, e.g., from commercially available analog or digital circuits or a microprocessor, which can also attend to other control functions in the dye laser.

The control prevents the dye laser from being put into operation, if the level in the supply vessel is too high or low before switching on. A too high or low filling level in the supply vessel can even lead to variations in the operating characteristics of the dye laser in the case of an undisturbed dye circuit. It is naturally possible to use any sensor for the filling level which enables a liquid level in a vessel to be measured. However, it is particularly advantageous to use an optical sensor. The sensor can be a reflex sensor and a direct vision sensor.

A particularly simple construction of the control is possible if there are four sensors, one for a too high level, one for the correct level, one for the level to which the dye should drop after switching on and one for a too low level.

The control can also be used for automatic dye change purposes after predetermined periods of use.

BRIEF DESCRIPTION OF THE DRAWINGS

FIG. 1 is a diagram showing the construction of a dye laser according to the invention.

FIG. 2 is a block circuit diagram of a control for the laser shown in FIG. 1.

BEST MODE FOR CARRYING OUT THE INVENTION

With reference to FIG. 1, a dye circuit of a dye laser contains a dye capable of undergoing laser action in an optical cavity. Prior to the switching on of the laser, the dye is located in a supply vessel 1, which is connected via a line 2 to a pressure vessel 4. Line 2 has a pump 3 which circulates the dye.

The pressure vessel 4 is constructed in such a way that there is an air pocket therein, which compensates vibrations, fluctuations in delivery of pump 3, etc. By means of a line 8, pressure vessel 4 is connected to a nozzle 5, from which the dye is discharged as a jet on operating the dye laser. The pump laser beam entering the jet and the elements required for producing said beam are not shown. The optical components and the like required for a dye laser and which are provided in the same way as in known dye lasers are also not shown.

The dye discharged from nozzle 5 is collected in a collecting container 6 after leaving the jet region and flows back into the supply vessel 1 via a return line 7. To the extent described above, the construction of the dye laser is known.

According to the invention, the supply vessel filling level is monitored because it can be used to obtain information on the operating state of the laser and particularly for detecting fluctuations in operating data. For this purpose, on supply vessel 1 there are four optical sensors 71, 72, 73 and 74, which make it possible to detect the filling level The sensors are preferably optical direct vision sensors, which, e.g., comprise a light transmitter provided on one side of supply vessel 1 and a light receiver provided on the other side. The light transmitter, e.g., a light-emitting diode, is advantageously chosen in such a way that the light emitted by it is strongly absorbed by the dye used. The light receiver can e.g., be a photodiode or a phototransistor.

In FIG. 2, the four direct vision sensors 71, 72, 73 and 74 have four light-emitting diodes 11, 12, 13, 14 and four phototransistors 21, 22, 23, 24, which are in each case arranged on facing sides of the supply vessel 1. The sensors are so distributed on the vessel that in the case of a correct filling level at output A1 of sensor 71 there is a signal with logic level zero and at outputs A2 to A4 of sensor 72 to 74 a signal with the logic level 1. If, after switching on, the level drops to the correct point, then there is also a signal with logic level 0 at output A2 of sensor 72.

The control also has an AND-element 15 with four input terminals, two inverters 16, 17, a double switch 18, 18' and a circuit breaker 19.

Outputs A3 and A4 of photosensors 73, 74 are directly connected to the input terminals of the AND-element 15. Output A1 is connected across an inverter 16 to an input terminal of AND-element 15, while output A2 is connected with the remaining input terminal of AND-element 15 across switch 18 either directly or via inverter 17.

The output terminal of the AND-element 15 is connected to the circuit breaker 19, which switches on and off the laser power supply.

In operation, if prior to the switching on of the laser, the filling level in supply vessel 1 is correct, then there is a signal with logic level 1 at the output terminals of sensors 72, 73, 74 and a signal with logic level zero at the output terminal of sensor 71. As the dye laser has not yet been switched on, the output terminal A2 of sensor 72 is directly connected to the associated input terminal of the AND-element 15. As the output terminal A1 is also connected via inverter 16 to the associated input terminal of AND-element 15, there are signals with logic level 1 at all the input terminals of the AND-element, so that there is also a signal 1 at the output terminal of AND-element 15, which switches through the circuit breaker 19, so that the power supply for the dye laser is released.

If prior to switching on, the level in the supply vessel is too high or low, then signals with logic level 1 do not appear at all the input terminals of AND-element 15, so that the resulting output signal of said element opens the circuit breaker 19 with logic level zero and consequently blocks the power supply for the dye laser.

It is assumed hereinafter that the level in supply vessel 1 was correct before switching on. As a result of the switching on of the dye laser, the double switch 18, 18', which is, e.g., connected mechanically to the closing switch of the dye laser, is switched over, so that the output terminal A2 of sensor 72 is now connected across inverter 17 to the associated input terminal of AND-element 15. Simultaneously, by means of a line 25, circuit breaker 19 is locked for a certain time, which is necessary for achieving a stationary operating state, in the position in which it releases the power supply for the dye laser.

If at the end of this time, the filling level in the supply vessel 1 has dropped by the correct amount, then the output signal of sensor 72 changes, i.e., there is a signal with logic level zero at its output terminal A2. Since, however, sensor 72 is now connected across inverter 17 to the associated input terminal of AND-element 15, there continues to be a signal with logic level 1 at its input terminal, so that at the output terminal of AND-element 15 there continues to be a signal which switches through the circuit breaker 19, i.e., the dye laser remains switched on.

However, if the dye level does not drop to a sufficient amount, then there continues to be a signal with logic level 1 at output terminal A2 of sensor 72, i.e., there is a signal with logic level zero at the corresponding input terminal of AND-element 15.

In the same way, an excessive drop in the dye level, there is a signal with logic level zero at the output terminal of sensor 73 and consequently at the corresponding input terminal of AND-element 15.

At the output terminal of AND-element 15, there is then in both cases a signal with logic level zero, which blocks the circuit breaker 19, so that the dye laser is switched off.

The invention has been described above relative to one embodiment. In particular the circuit described in connection with FIG. 2 constitutes a basic circuit for illustrating the operation of the control according to the invention. It is obviously not only possible, but even advantageous, to replace the circuit arrangement formed from logic circuits by a microprocessor control. In addition, this microprocessor is able to diagnose faults from the level sensor signals, i.e., a self-diagnosis of the apparatus is possible when faults occur. The control can also bring about the refilling and/or changing of the dye.

Naturally further modifications are possible. For example, the level sensor can be constituted by a sensor which continuously measures the filling level.

We claim:
1. A safety system for a dye laser comprising,
  a supply vessel containing a dye solution filled to a dye filling level, said dye solution being pumped from said vessel, being discharged as a jet into an active laser region and flowing back into said vessel during laser operation,
  means for measuring said dye filling level in said supply vessel, and
  control means for switching off laser operation if said dye filling level fails to drop to a predetermined level after switching on laser operation, said control means switches off laser operation if said dye filling level is measured to be outside of a first predetermined range of high and low levels during laser operation.

2. The safety system for a dye laser of claim 1 further characterized in that said control means prevents laser operation if said dye filling level is measured to be outside of a second predetermined range of high and low levels before switching on the laser, said second predetermined level being different from said first predetermined level.

3. A safety system for a dye laser comprising,
  a supply vessel containing a dye solution filled to a dye filling level,
  a pump which pumps said dye solution during laser operation from said supply vessel into a pressure vessel, said pressure vessel having means for damping vibrations and fluctuations in dye solution pressure due to said pump, a nozzle receiving dye solution from said pressure vessel, said nozzle discharging said dye solution as a jet into an active laser region, said dye solution subsequently flowing back into said supply vessel, at least one sensor for measuring said dye filling level in said supply vessel, and control means for switching off laser operation if said dye filling level, as detected by said at least one sensor, fails to drop to a predetermined level after switching on laser operation, said control means switches off laser operation if said dye filling level is detected to be outside of a first predetermined range of high and low levels during laser operation.

4. The safety system for a dye laser of claim 3 further characterized in that said control means prevents laser operation if said dye filling level is measured to be outside of a second predetermined range of high and low levels before switching on the laser, said second predetermined level being different from said first predetermined level.

5. A safety system for a dye laser comprising, a supply vessel containing a dye solution filled to a dye filling level, a pump which pumps said dye solution during laser operation from said supply vessel into a pressure vessel, said pressure vessel having means for damping vibrations and fluctuations in dye solution pressure due to said pump, a nozzle receiving dye solution from said pressure vessel, said nozzle discharging said dye solution as a jet into an active laser region, said dye solution subsequently flowing back into said supply vessel, four optical sensors for measuring said dye filling level in said supply vessel, said sensors being a first sensor for detecting a too high level, a second sensor for a correct level, a third sensor for said predetermined level to which said dye solution should drop after switching on laser operation, and fourth sensor for detecting a too low level, and control means for switching off laser operation if said dye filling level, as detected by said sensors, fails to drop to a predetermined level after switching on laser operation, said control means comprising a logic circuit in communication with said four sensors and with a circuit breaker for switching on and off laser operation, said logic circuit having an AND-element with four input terminals and an output terminal, said output terminal being connected to said circuit breaker, each of said input terminals connected for receiving a signal from one of said four sensors, said logic circuit also having a first inverter with a first input connected to said first sensor and a first output connected to one of said input terminals of said AND-element, and a second inverter with a second input connected across a switch during laser operation to said second sensor and a second output connected to one of said input terminals of said AND-element, said second sensor being directly connected to one of said input terminals or said AND-element before switching on laser operation, said third and fourth sensors being directly connected to said respective remaining input terminals of said AND-element.

* * * * *

UNITED STATES PATENT AND TRADEMARK OFFICE

Certificate

Patent No. 4,733,400                                                Patented: March 22, 1988

On petition requesting issuance of a certificate for correction of inventorship pursuant to 35 USC 256, it has been found that the above-identified patent, through error and without any deceptive intent, improperly sets forth the inventorship. Accordingly, it is hereby certified that the correct inventorship of this patent is:
Reinhardt Thyzel, Eckhard Schroder and Ludger Woste Signed and Sealed this Twenty-ninth Day of May, 1990

WILLIAM L. SIKES

*Supervisory Patent Examiner*
*Group Art Unit 251*